AMPLIFIER HAVING SERIES REGULATED VOLTAGE SUPPLY

Filed Oct. 20, 1965 Sheet 1 of 2

INVENTOR.
JAMES LEE JENSEN
BY Bruce C Lutz
ATTORNEY

INVENTOR.
JAMES LEE JENSEN
BY Bruce C Lutz
ATTORNEY

United States Patent Office 3,426,290

Patented Feb. 4, 1969

3,426,290
AMPLIFIER HAVING SERIES REGULATED VOLTAGE SUPPLY

James Lee Jensen, Frankfurt am Main, Germany, assignor to Honeywell Inc., Minneapolis, Minn., a corporation of Delaware Filed Oct. 20, 1965, Ser. No. 498,515
U.S. Cl. 330—40 11 Claims
Int. Cl. H03f 3/04

ABSTRACT OF THE DISCLOSURE

A high efficiency amplifier circuit with circuitry for controlling the voltage supplied to the output stage to a level slightly more than that necessary for an undistorted output signal.

*The invention*

The present invention relates generally to amplifiers and more specifically to high efficiency amplifiers obtained by keeping the supply voltage to the output stage of an amplifier only slightly more than that necessary to obtain an undistorted output signal.

The prior art is replete with amplifier circuits which drop the excess voltage across the output stage of the amplifier transistors or other valves. However, the dropping of the voltage across the output transistors produces high or large amounts of dissipation and accordingly requires a heavy duty output stage. If however the voltage across the output transistor can be kept at a value such that the transistor is only slightly out of saturation at all times, the dissipation will be greatly decreased and smaller physical size transistors may be utilized. If in addition the regulator is of a switching type, similar to that shown in my Patent 2,776,382 issued Jan. 1, 1957, and assigned to the same assignee as the present invention, such that it also dissipates a minimum of power, a very high efficiency combination unit is obtained without the requirement of using power transistors in either the regulator portion or the amplifier output portion of the circuit. While one of the circuits shown operates substantially as described, an even more efficient and stable embodiment is obtained by adding an oscillator to operate the switching regulator circuit at a frequency higher than would normally be obtained with the first embodiment of the invention.

Various objects and advantages of the invention may be determined from a reading of the specification and appended claims in conjunction with the figures wherein:

Figure 1:
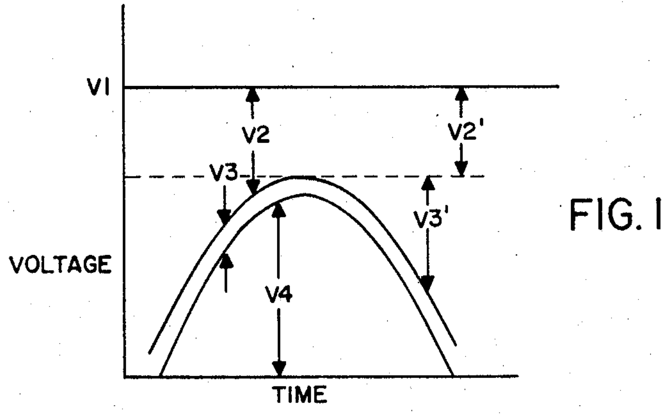
FIGURE 1 is a representation of voltages found in the circuit.

As may be observed in FIGURE 1 the vertical axis of the graph is voltage while the horizontal graph is time. A horizontal line represents the voltage of the DC or direct current supply which supplies power to the circuitry and is labeled V1. A second voltage which is the difference in potential between V1 and the power supplied to the amplifier circuit is labeled V2. A third voltage which is voltage dropped across the transistors or valves in the amplifier is described as V3. The voltage which appears across the load is designated as V4. The voltages V2 and V4 vary the most significantly during operation while V3 varies very slightly and V1 varies very little.

V4 can be a voltage which is indicative of one half cycle of a sine wave or can be any other waveform indicative of an input signal. V4 plus V3 is the voltage waveform of the power applied to the amplifier portion of the circuit and will in general follow the waveform of the input signal to the amplifier. The voltage drop across the transistors in the amplifier is the voltage designated as V3. The purpose of the invention is to keep this voltage V3 at a nearly constant and nearly minimum value. The voltage V2 is dropped across the switching regulator transistor and since the regulator is used in a switching form, the transistors are either in an OFF or an ON condition and therefore always in the most efficient mode of operation.

Figure 2:
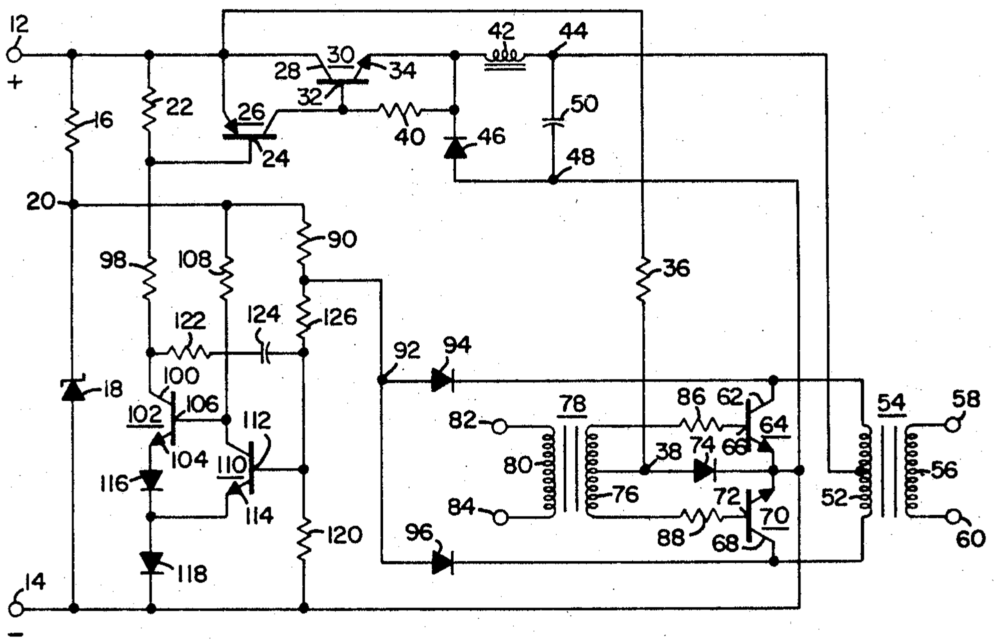
FIGURE 2 is a schematic diagram of a basic portion of one embodiment of the invention.

In FIGURE 2 two power supply input terminals 12 and 14 are shown with terminal 14 being optionally grounded if necessary although not shown as such in the present circuit since terminal 14 in one embodiment is a negative potential while terminal 12 is a positive potential and no ground or reference potential is required. A resistor 16 is connected in series with a Zener diode 18 between terminals 12 and 14. A junction point 20 is situated between the two components 16 and 18 at which a potential is derived which is positive with respect to the terminal 14. A resistor 22 is connected between terminal 12 and a base 24 of a PNP transistor generally designated as 26. An emitter of transistor 26 is connected to terminal 12 and also to a collector 28 of an NPN transistor generally designated as 30 having a base 32 and an emitter 34. A collector of transistor 26 is connected to base 32. A resistor 36 is connected between terminal 12 and a junction point 38. A resistor 40 is connected between base 32 and emitter 34. An inductance or coil 42 is connected between the emitter 34 and a junction point 44. A diode 46 is connected between emitter 34 and a junction point 48 which is further connected to terminal 14. Diode 46 is connected such that its direction of easy current flow is toward emitter 34. A capacitor 50 is connected between junction points 44 and 48. Junction point 44 is also connected to an intermediate tap which in one embodiment is a center tap of a primary winding 52 of a transformer generally designated as 54 having a secondary winding 56 whose end terminals are connected to output terminals 58 and 60. One end of primary winding 52 is connected to a collector 62 of a transistor generally designated as 64 having a base 66. The other end of primary winding 52 is connected to a collector 68 of a transistor generally designated as 70 having a base 72. The emitters of transistors 64 and 70 are connected together and to junction point 48. A diode 74 is connected between junction points 38 and 48 such that the direction of easy current flow is toward junction point 48. Junction point 38 is also connected to an intermediate tap of a secondary winding 76 of a transformer generally designated as 78 having a primary winding 80 with end terminals connected to input terminals 82 and 84. A signal source (not shown) is connected between terminals 82 and 84 for driving the final stage of the amplifier constituting transistors 64 and 70. One end of winding 76 is connected through resistor 86 to base 66. A second resistor 88 is connected between base 72 and the other end of winding 76. A resistor 90 is connected between junction point 20 and a junction point 92. A pair of diodes 94 and 96 are connected with their anodes to junction point 92 such that the direction of easy current flow is away from junction point 92. The cathodes of the two diodes 94 and 96 are connected to collectors 62 and 68 of transistors 64 and 70 respectively. A resistor 98 is connected between base 24 of transistor 26 and a collector 100 of an NPN transistor generally designated as 102 having an emitter 104 and a base 106. A resistor 108 is connected between junction point 20 and base 106. Base 106 is further connected to a collector of an NPN transistor generally designated as 110 having a base 112 and an emitter 114. A diode 116 is connected between emitters 114 and 104 in a direction such that easy current flow is away from emitter 104. A further diode 118 is connected between emitter 114 and negative input terminal 14 such that the direction of current flow is toward terminal 14. A resistor 120 is connected between base 112 and terminal 14. A resistor 122 is connected in series with a capacitor 124 between collector 100 and base 112. A resistor 126 is connected between junction point 92 and base 112.

Transistor 30 in FIGURE 2 together with its associated circuitry comprises a switching regulator circuit with an input at 12, an output at terminal 44 and controlled by a signal applied to an input which in the disclosed embodiment comprises the base 24 of transistor 26.

Transistors 102 and 110 in FIGURE 2 together with their associated bias networks comprise a detector circuit which supplies the control signal to the switching regulator circuit in response to an input signal received at terminal 92 of the detector circuit from the amplifier circuit through diodes 94 and 96. Resistor 16 and Zener diode 18 provide a regulated voltage at terminal 20 to power the detector circuit.

Transistors 64 and 70 make up the output stage of an amplifier with input terminals 82 and 84 and output terminals 58 and 60, receiving power from terminal 44 and biased through resistor 36.

Figure 3:
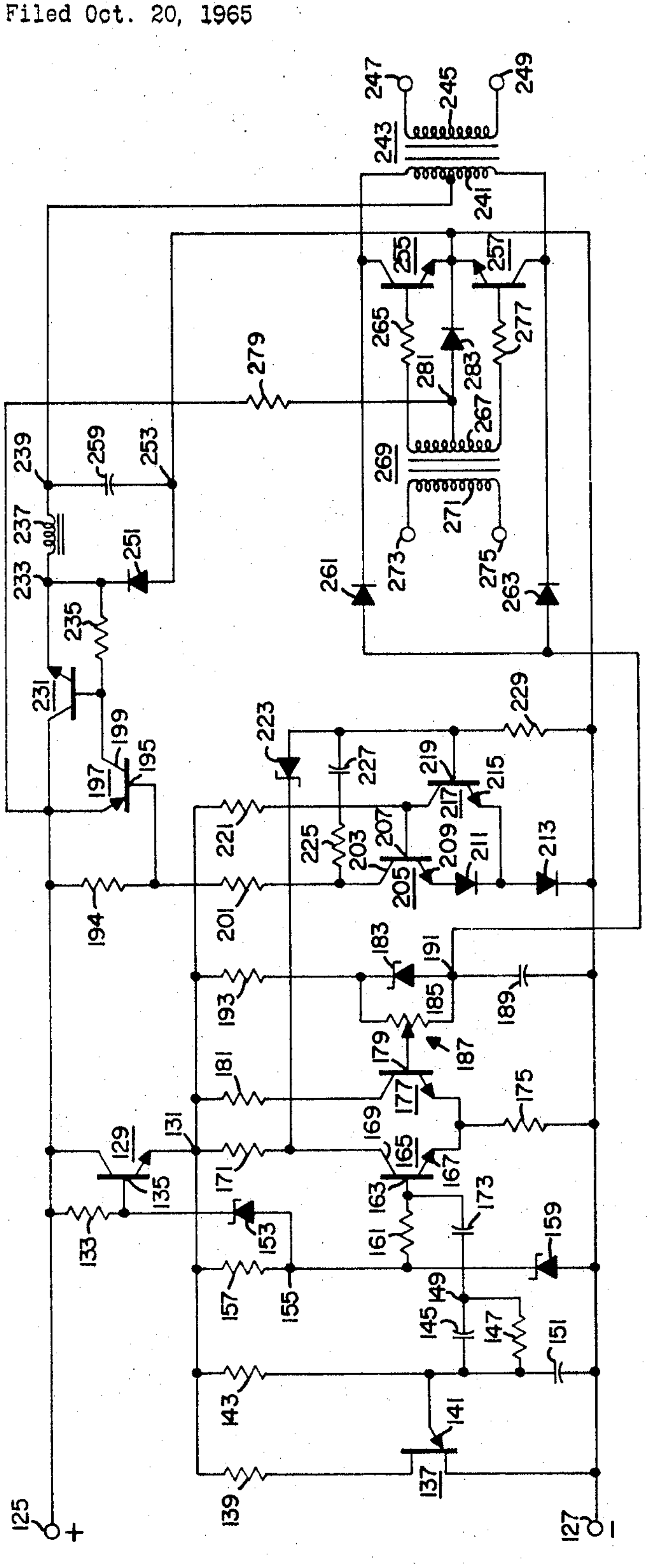
FIGURE 3 is an improved embodiment of the circuitry shown in FIGURE 2.

In FIGURE 3 two input terminals 125 and 127 are shown representing positive and negative inputs respectively. These two terminals are connected to a source of DC or direct voltage potential. An NPN transistor 129 has a collector connected to terminal 125 and an emitter connected to a junction point generally designated as 131. A resistor 133 is connected between terminal 125 and a base 135 of transistor 129. A unijunction transistor or solid state switch means 137 has one base connected to terminal 127 and the other base connected through a resistor 139 to junction point 131. An emitter 141 of unijunction transistor 137 is connected through a resistor 143 to junction point 131. A capacitor 145 is connected in parallel with a resistor 147 between emitter 141 and a junction point 149. A capacitor 151 is connected between emitter 141 and terminal 127. A Zener diode 153 is connected between base 135 and a junction point 155 in a direction such that current flow through diode 153 toward junction 155 causes the diode to have a nearly constant voltage at its terminals. This voltage is known as the Zener voltage. A resistor 157 is connected between junction point 131 and junction point 155. A Zener diode 159 is connected between junction point 155 and terminal 127 such that the direction of easy current flow is away from terminal 127. A resistor 161 is connected between junction point 155 and a base 163 of an NPN transistor generally designated as 165 having an emitter 167 and a collector 169. A resistor 171 is connected between junction point 131 and collector 169. A capacitor 173 is connected between junction point 149 and base 163. A resistor 175 is connected between terminal 127 and emitter 167 which is further connected to an emitter of an NPN transistor generally designated as 177 having a base 179. A collector of transistor 177 is connected through a resistor 181 to the junction point 131. A Zener diode 183 is connected in parallel with a resistance element 185 of a potentiometer generally designated as 187 having a wiper connected to base 179. A capacitor 189 is connected between terminal 127 and a junction point 191 which is further connected to an anode of diode 183. Diode 183 is situated such that junction point 191 is negative with respect to the other end of potentiometer 187. A resistor 193 is connected between junction point 131 and the cathode of Zener diode 183. A resistance element 194 is connected between terminal 125 and a base 195 of a PNP transistor generally designated as 197 having an emitter connected to terminal 125 and having a collector 199. A resistor 201 is connected between base 195 and a collector 203 of an NPN transistor generally designated as 205 having a base 207 and an emitter 209.

Two diodes 211 and 213 are connected in series between emitter 209 and terminal 127 such that the direction of easy current flow for both diodes is toward terminal 127. A junction point between the two diodes 211 and 213 is connected to an emitter 215 of an NPN transistor generally designated as 217 having a base 219. A collector of transistor 217 is connected to base 207 and is also connected through a resistor 221 to junction point 131. A Zener diode 223 is connected between collector 169 and base 219 such that base 219 is negative with respect to collector 169. A resistor 225 is connected in series with a capacitor 227 between collector 203 and base 219. A resistor 229 is connected between base 219 and terminal 127. An NPN transistor generally designated as 231 has a collector connected to terminal 125 and a base connected to collector 199 while an emitter is connected to a junction point 233. A resistor 235 is connected between collector 199 and junction point 233 while an inductance 237 is connected between junction point 233 and a junction point 239 which is further connected to an intermediate tap of a primary winding 241 of a transformer generally designated as 243 having a secondary winding 245. The ends of transformer winding 245 are connected to output terminals 247 and 249. A diode 251 is connected between junction point 233 and a junction point 253 which is further connected to terminal 127 and also to the emitters of two NPN transistors 255 and 257. A capacitor 259 is connected between junction point 239 and 253. One end of winding 241 is connected to a collector of transistor 255 and is also connected to a cathode of a diode 261. The other end of winding 241 is connected to a collector of transistor 257 and also a cathode of diode 263. The two anodes of diodes 261 and 263 are connected together and to junction point 191 such that the direction of easy current flow is away from junction point 191. A resistor 265 is connected between a base of transistor 255 and one end of a winding 267 of a transformer generally designated as 269 having a primary winding 271 whose ends are connected to input terminals 273 and 275. A source of input signal (not shown) is connected between input terminals 273 and 275. A resistor 277 is connected between a base of transistor 257 and the other end of winding 267. A resistor 279 is connected between terminal 125 and a junction point 281 which is further connected to an intermediate tap which in one embodiment was a center tap of winding 267. A diode 283 is connected between junction point 281 and junction point 253 in a direction such that easy current flow is toward junction point 253.

Figure 4:
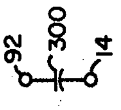
FIGURE 4 is a capacitor for use with FIGURE 2 to provide an alternate embodiment for use under slightly different conditions.

FIGURE 4 has a capacitor 300 connected between terminals 92 and 14 to illustrate placement when used in conjunction with FIGURE 2.

*Operation*

In describing the operation of the circuit shown in FIGURE 2, it should be realized that the biasing of the circuit is such that with diodes 94 and 96 in a non-conducting condition, the current through resistors 90 and 126 is such that transistor 110 is turned to an ON condition. With transistor 110 in an ON condition, there is insufficient current to actuate transistor 102 and it therefore remains in an OFF condition. It will be assumed for the purpose of the explanation that initially the entire circuit is just turned ON. At this point there is no voltage on capacitor 50 and therefore no voltage across transistors 64 and 70. The bias from resistor 36 and diode 74 tends to turn ON transistors 64 and 70. Assume that the polarity of any input signal to transformer 78 is such that transistor 64 is made more conducting. Therefore, a conducting path exists from junction 92 through diode 94 and transistor 64 to terminal 48. The conduction reduces the current flow through resistors 126 and 120 and therefore turns OFF transistor 110. Note that if the polarity of the input to transformer 78 is reversed, transistor 70 is made more conducting and the conduction from junction 92 through diode 96 and transistor 70 to terminal 48 also reduces the current flow through resistors 126 and 120, turning OFF transistor 110. With transistor 110 turned to an OFF condition because one of the diodes 94 or 96 is conducting, transistor 102 turns ON and actuates transistor 26 and accordingly transistor 30. Current then flows through transistor 30 to the capacitor 50 through inductance 42. In a short period of time capacitor 50 will be charged sufficiently to raise the voltage on the collectors of transistors 64 and 70 so that both diodes 94 and 96 stop conducting and this allows current flow through resistor 126 to be sufficient so that transistor 110 turns to an ON condition. With transistor 110 ON, transistors 102, 26, and 30 turn OFF. Under these conditions the energy of inductance 42 and of capacitor 50 is fed to the output. As will be realized the voltage across capacitor 50 will decrease such that diode 94 or 96 will again start conducting and start the entire sequence of events over again so that transistor 30 turns ON and capacitor 50 charges again. If a larger input signal is then applied to the primary winding 80 of transformer 78, one of the transistors such as 64 will turn even further ON. With transistor 64 turning further ON, and with diode 94 conducting, the remaining transistors will be actuated so that additional voltage is applied to capacitor 50 to raise the voltage on the collector of transistor 64. With proper time constant chosen with the frequency of the input signal taken into account, the voltage across the collectors of transistors 64 and 70 can be changed fast enough so that a substantially constant voltage appears across the conducting transistor of this pair. This voltage is represented as V3 in FIGURE 1. The input signal and accordingly the output signal appearing across secondary winding 56 is represented by V4. The only difference between the two signals would be in the magnitude of either current or voltage between the input and output transformers. It should be noted that feedback techniques such as are well-known in the art may be used to connect the output from transformer 54 to the input of transformer 78 to ensure that the output signal conforms to the input signal. Since power dissipated by the transistors is represented primarily by the voltage from collector to emitter times the current flowing therethrough, it will be realized that a minimum voltage across the transistors will provide the least power dissipation and therefore require the smallest possible transistors. However, it is not satisfactory to have these transistors saturated as this would leave no cushion for changes in input signal such that a signal can be generated to turn on the regulating transistors or such that the conduction of the output transistors can be changed to preserve the output waveform. Thus the proper condition for the ON transistor in the output is that condition just before voltage cutoff or alternately defined as the condition just before the point where the collector base junction is forward biased. In different terminology, it is the condition where the collector base junction is still reverse biased and still has a short way to go before the forward baised condition occurs.

Under some conditions it may be desirable to switch the switching regulator, using transistor 30, at a faster rate so that a more even value of V3 is obtained. Such an embodiment is shown in FIGURE 3 wherein unijunction transistor 137 is part of an oscillator circuit. This oscillator oscillates at a higher natural frequency than what would be obtained by the switching frequency of the circuit of FIGURE 2. Transistor 129 is used in conjunction with the Zener diodes 153 and 159 to provide a fairly constant voltage at junction point 131. The operation of this unit is quite similar to the previous unit except that a differential amplifier comprising transistors 165 and 177 is utilized. If the voltage across the lowest collector emitter junction of the two transistors 255 and 257 is too high, transistor 177 will turn to a conducting condition thereby turning transistor 165 OFF. With transistor 165 OFF, more current will flow through Zener diode 223 and turn transistor 217 ON thereby turning OFF transistor 205, 197, and 231. With these transistors turned OFF, the only current supplied to the output transistors 255 and 257 comes from the inductance 237 and the capacitor 259. Thus, with the discharge of capacitor 259, the collector voltage of these transistors is lowered, in addition, an input signal from the oscillator utilizing transistor 137 also appears at base 163 of transistor 165. This oscillator signal will vary the voltage at collector 169 continuously so that the current through Zener diode 223 is varied continuously and therefore the switching operation transistor 217 and accordingly transistors 205, 197, and 233 will switch somewhat earlier than normal in the event of change of conditions at the output of transistors 255 and 257. The stability of the circuit is enhanced and the output waveform is also improved by these additional features of FIGURE 3.

FIGURE 4 illustrates an addition which may be utilized with FIGURE 2 to provide the voltage conditions V2′ and V3′ shown in FIGURE 1. The capacitor 300 when inserted in FIGURE 2 between junction points 92 and 14 will change the frequency response of the circuit to hold the switching regulator output voltage at a fairly steady DC level minimum. This minimum voltage level is just large enough to prevent the amplifier output transistors from going into voltage cutoff or saturation at any part of the half cycle and in particular at the point of peak output voltage. This method of operation of my invention is therefore to provide a slowly varying direct voltage output which varies with the peak level of the amplifier input signal in contra-distinction to the previously described continuous voltage change of FIGURE 2 alone.

The capacitor 189 in FIGURE 3, if adjusted in capacitive value, will perform the same function as capacitor 300 does in FIGURE 2. While the method of operation presently being described has lower efficiency than the embodiments first described, it may be used in conjunction with devices with constant output and widely varying input supply voltages.

While only a few embodiments of the invention have been shown, it is to be realized that many other embodiments of the invention will be readily apparent to those skilled in the art. It will be further realized that while the transistors and various other components have been called by one specific name for purposes of clarity, that the transistors are also switching means, amplifying means, transducers, valves etc., and the resistors are often replaceable by other types of impedance means. Also, the Zener diodes may be designated voltage reference means. As was discussed earlier, the two transistors 197 and 231 perform the operation of a switching type regulator although it is to be realized that with somewhat reduced efficiencies that the switching type regulator need not be used to practice the purpose of the invention which is to keep the voltage across the collector to emitter junction of the one of the transistors 255 and 257 which is nearest to saturation near a predetermined value so as to minimize the size of these transistors and reduce the power dissipation therefrom. For the reasons stated above I intend to be limited only by the scope of the claims in which I claim:

1. Circuitry for minimizing power dissipation in an output stage of an amplifier, comprising, in combination:

power supply means for supplying power;

amplifier means having power input means and signal input and output means;

series regulator circuit means, including control means, connected between said power supply means and said power input means of said amplifier means, for variably controlling the voltage supplied to said power input means of said amplifier means in response to a control signal applied to said control means; and detection circuit means connected to said signal output means of said amplifier means and to said control means for supplying a control signal to said series regulator circuit means in response to signals received from said signal output means of said amplifier means to keep the voltage supplied to said power input means of said amplifier means, at any given point in time, slightly more than necessary for providing undistorted output signals from said amplifier means.

2. Apparatus as defined in claim 1 wherein the regulator circuit is a switching type regulator.

3. Apparatus as defined in claim 1 wherein said amplifier means includes at least one output valve and said detection circuit controls said regulator means to keep the voltage drop across said output valve at a substantially constant value.

4. Apparatus as defined in claim 2 comprising, in addition, an oscillator connected to said detection circuit means for increasing the natural switching frequency of said switching regulator circuit means thereby more accurately regulating the power supplied to said amplifier means.

5. Apparatus as defined in claim 3 wherein said output valve is a transistor and the voltage drop there-across is slightly more than the saturation voltage of the transistor for minimizing power dissipation therefrom.

6. Apparatus as defined in claim 4 wherein the switching regulator circuit means includes a filter circuit to smooth the variations in signal level received from the switching portion thereof, where the amplifier means includes at least one output transistor, and where the detection circuit detects the voltage drop across said transistor and controls the switching regulator circuit means to supply enough power to said transistor to keep it slightly out of saturation thereby minimizing power dissipation from said transistor.

7. Circuitry for minimizing power dissipation in an output stage of an amplifier, comprising, in combination:

power supply means for supplying power;

amplifier means having power input means and signal input and output means;

series regulator circuit means, including control means, connected between said power supply means and said power input means of said amplifier means, for variably controlling the voltage supplied to said power input means of said amplifier means in response to a control signal applied to said control means; and detection circuit means connected to said signal output means of said amplifier means and to said control means for supplying a control signal to said series regulator circuit means in response to signals received from said signal output means of said amplifier means to keep the voltage supplied to said amplifier means, at any given point in time, at a substantially constant level which is slightly more than necessary for providing undistorted output signals from said amplifier means.

8. Apparatus as defined in claim 7 wherein said amplifier means includes at least one output valve and said detection circuit controls said regulator means to keep the minimum voltage drop during each cycle across said output valve at a substantially constant value.

9. Apparatus as defined in claim 8 wherein said output valve is a transistor and the minimum voltage drop there-across is slightly more than the saturation voltage of the transistor for minimizing power dissipation therefrom.

10. Amplifier circuitry, including circuitry for minimizing the dissipation in the output stage of the amplifier, comprising in combination:

power supply means for supplying power;

amplifier means, including power input means, signal input means for receiving an input signal, output means for producing an amplified output signal, and means for sensing the output signal;

series regulator circuit means, including control input means, power input and output means, for variably controlling any voltage drop between said power input and output means in response to a control signal applied to said control means;

means connecting said power input means of said series regulator circuit means to said power supply means and said power output means of said regulator circuit to said power input means of said amplifier means; and detection circuit means connected between said means for sensing the output signal of said amplifier means and said control means of said series regulator circuit means for supplying a control signal to said series regulator circuit means in response to signals received from said means for sensing the output signal to keep the voltage supplied to said amplifier means from said series regulator means, at any given instant, slightly more than necessary for providing undistorted output signals from said amplifier means.

11. Amplifier circuitry comprising in combination:

first and second power supplying means;

first resistive means connected in series with Zener diode means, said Zener diode means having cathode and anode means, forming first junction means between said first resistive means and said cathode means, said first resistive means and said Zener diode means connected between said first power supply means and said second power supply means, said first resistive means connected to said first power supplying means, said anode means of said Zener diode means connected to said second power supplying means;

first NPN transistor means having emitter, base and collector means, second resistive means connected between said base means of said first transistor means and said second power supply means;

first diode means having anode and cathode means, said anode means of said first diode means connected to said emitter means of said first NPN transistor means, said cathode means of said first diode means connected to said second power supply means;

second diode means having anode and cathode means, said cathode means of said second diode means connected to said anode means of said first diode means;

second NPN transistor means having emitter, base and collector means, said emitter means of said second NPN transistor means connected to said anode means of said second diode means, said base means of said second NPN transistor means connected to said collector means of said first NPN transistor means, third resistive means connected between said base means of said second NPN transistor means and said first junction means;

fourth and fifth resistive means serially connected to form second junction means therebetween, said fourth and fifth resistive means connected between said first junction means and said base means of said first NPN transistor means, sixth resistive means connected in series with first capacitive means between said base means of said first NPN transistor means and said collector means of said second NPN transistor means, seventh and eighth resistive means serially connected to form third junction means therebetween, said seventh and eighth resistive means connected between said first power supply means and said collector means of said second NPN transistor means;

first PNP transistor means having emitter, base and collector means, said base means of said first PNP transistor means connected to said third junction means, said emitter means of said first PNP transistor means connected to said first power supply means;

third NPN transistor means having emitter, base and collector means, said collector means of said third NPN transistor means connected to said first power supply means, said base means of said third NPN transistor means connected to said collector means of said first PNP transistor means, ninth resistive means connected between said base means and said emitter means of said third NPN transistor means, third diode means having anode means and cathode means, said cathode means connected to said emitter means of said third NPN transistor means, said anode means of said third diode means connected to said second power supply means;

first transformer means having a primary winding and a secondary winding for providing an amplified output signal, said primary winding having first and second end connection means and third connection means intermediate said first and second end connection means;

inductor means connected between said third connection means of said primary winding of said first transformer means and said emitter means of said third NPN transistor means, second capacitive means connected between said third connection means of said primary winding of said first transformer means and said second power supply means;

second transformer means having a primary winding for receiving an input signal to be amplified and a secondary winding, said secondary winding of said second transformer means having first and second end connection means and third connection means intermediate said first and second end connection means, tenth resistive means connected between said first power supply means and said third connective means on said second transformer means, fourth diode means having anode and cathode means, said anode of said fourth diode means connected to said third connective means on said second transformer means, said cathode of said fourth diode means connected to said second power supply means;

fourth and fifth NPN transistor means each having emitter, base and collector means, said emitter means of said fourth and fifth NPN transistor means connected together and to said second power supply means, said collector means of said fourth NPN transistor means connected to said first end connection means of said primary winding of said first transformer means, said collector means of said fifth NPN transistor means connected to said second end connection means of said primary winding of said first transformer means, eleventh resistive means connected between said first end connection means of said secondary winding of said second transformer means and said base means of said fourth NPN transistor means, twelfth resistive means connected between said second end connection means of said secondary winding of said second transformer means and said base means of said fifth NPN transistor means;

fifth and sixth diode means, each having anode means and cathode means, said anode means of said fifth and said sixth diode means connected together and to said second junction means, said cathode means of said fifth diode means connected to said collector means of said fourth NPN transistor means, said cathode means of said sixth diode means connected to said collector means of said fifth NPN transistor means;

whereby a signal applied to said primary winding of said second transformer means produces an amplified output at said secondary winding of said first transformer means and the dissipation in said fourth and fifth NPN transistor means is minimized by controlling the power supplied to said third connective means on said primary winding of said first transformer means to a level slightly more than necessary for providing undistorted output signals from said secondary winding of said first transformer means.

No references cited.

ROY LAKE, *Primary Examiner.*

L. J. DAHL, *Assistant Examiner.*

U.S. Cl. X.R.

323—22